United States Patent [19]
Ebner

[11] Patent Number: 5,933,256
[45] Date of Patent: *Aug. 3, 1999

[54] METHOD FOR COLOR CORRECTION WITHIN A COLOR SPACE USING HUE SHIFTING OF A REGION THEREIN

[75] Inventor: Fritz F. Ebner, North Rochester, N.Y.

[73] Assignee: Xexox Corporation, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/647,511

[22] Filed: May 14, 1996

[51] Int. Cl.$^6$ .................................................. G03F 3/08
[52] U.S. Cl. ........................................ 358/520; 358/518
[58] Field of Search .................................. 358/500, 504, 358/518–523; 348/30, 649–653; 399/39–41

[56] References Cited

U.S. PATENT DOCUMENTS

| | | | |
|---|---|---|---|
| 4,500,919 | 2/1985 | Schreiber | 358/78 |
| 4,941,038 | 7/1990 | Walowit | 358/504 |
| 5,483,360 | 1/1996 | Rolleston et al. | 358/518 |
| 5,528,386 | 6/1996 | Rolleston et al. | 358/522 |
| 5,594,557 | 1/1997 | Rolleston et al. | 358/518 |

OTHER PUBLICATIONS

Pat Wood; *Postscript Color Operators*; pp. 193–225.
*Postscript Language Reference Manual*; Adobe Systems; 2nd ed.; Addison–Wesley Publishing Company.
Fred W. Billmeyer, Jr. and Max Saltzman; *Principles of Color Technology*; Second Edition; Chapter 2, pp. 25–66.
*Xerox Disclosure Journal*; "Luminance Dependent Scaling of Chrominance Data"; Robert J. Rolleston, vol. 20, No. 3, May/Jun. 1995, pp. 275–282.

*Primary Examiner*—Thomas D. Lee
*Assistant Examiner*—Stephen Brinich

[57] ABSTRACT

The present invention is a method for the improved rendition of business color graphics. The method alters or corrects sensitive colors in documents by employing a hue shifting operation to provide improved color rendering.

9 Claims, 6 Drawing Sheets

METHOD FOR COLOR CORRECTION WITHIN A COLOR SPACE USING HUE SHIFTING OF A REGION THEREIN

This invention relates generally to the improved rendition of business color graphics, and more particularly to a method for altering or correcting sensitive colors in documents, the method employing a hue shifting operation to provide the improved color rendering.

COPYRIGHT NOTIFICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY OF THE INVENTION

The present invention is a method for altering or correcting the color gamut of an output device. It is a well-known phenomena in color printing to have, for example, the color blue (typically printed with maximum cyan and magenta and no yellow marking materials) rendered with a purplish hue or tint. Simply put, from a perceptual basis, many well-known colors are not be faithfully reproduced by equal combinations of primary printing colors. To accommodate this problem, a calibration operation is often performed for business graphics printing so that primary colors (red, green, blue cyan, magenta and yellow) are rendered in a manner to assure that the perceived color matches the color for which the name has a predefined color associated. It is known to employ multivariate linear regression to correct for non-pleasing primary colors, however, this is a global solution that may adversely affect other regions of the color space.

Accordingly, the present method was developed to correct gross errors for sensitive colors in documents, and employs a hue shifting operation to provide the improved color rendering.

In accordance with the present invention, there is provided a method for color correcting an image, the image being represented as a plurality of image signals in a first color space, comprising: converting an image signal representing a first device color space into a second device color space, wherein the second device color space is defined as a function of three dimensions and one of said dimensions represents hue; characterizing a hue shift function; applying the hue shift function to an image signal represented in said second device color space, to shift a first hue value of the image signal to a second hue value as determined by the hue shift function; and reconverting the image signal representing the second color space into a corrected image signal representing the first color space for rendition thereof.

In accordance with another aspect of the present invention, there is provided a method for warping a color space as a function of hue angle, comprising: mapping a first plurality of equidistant hue angles within a predefined range to a second plurality of non-linearly spaced, non-equidistant output hue angles; and recording the mapping therebetween receiving a first hue angle associated with an image signal, said first hue angle being one of the first plurality of hue angles; and producing, as a result of the mapping, a second hue angle for the image signal, wherein the second hue angle is one of the second plurality of hue angles.

In accordance with yet another aspect of the present invention, there is provided a method for color correcting an image, the image being represented as a plurality of image signals in a device color space, comprising: characterizing a mapping function, the mapping function mapping at least one input thereto to an alternative color wherein the alternative color is determined by a shift in a single component of an alternative color space; and applying the mapping function to each of the plurality of image signals to produce a plurality of modified image signals for rendering by a printing system.

One aspect of the invention is based on the discovery of a new technique for warping or otherwise shifting the hue within a color space to improve the color rendition of a printing system. More specifically, the technique accomplishes a simplified, one-time, warping of the color space to provide a vivid color output capability that may be selected by a user of a printing system. Upon invoking the vivid color mode, the printer employs the vivid color output capability. A machine implementing the invention can include any printing device capable of rendering output colors using a combination of two or more marking material colors.

Figure 1:
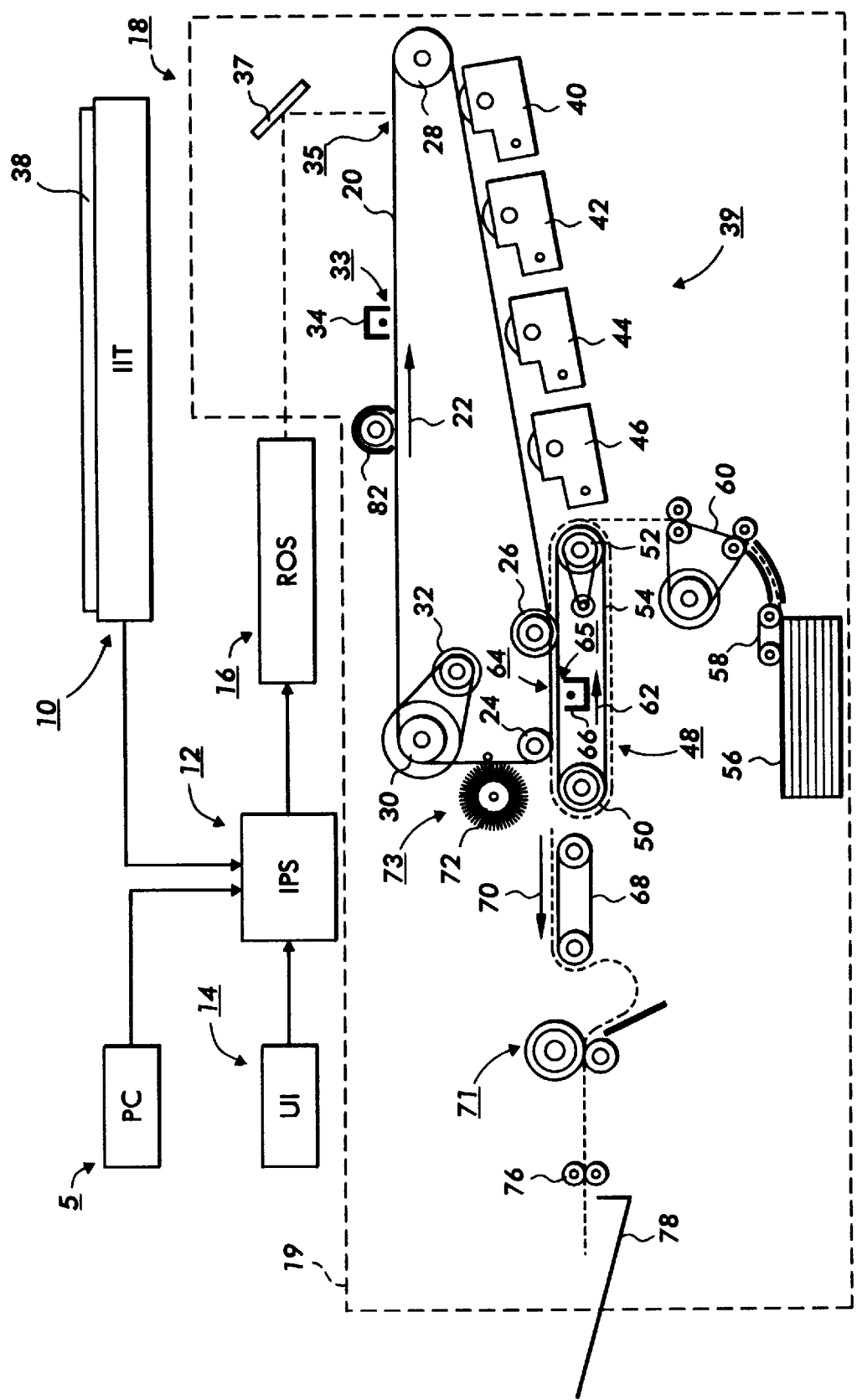
FIG. 1 is an illustration of an exemplary printer embodiment for the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" or "signal" refers to physical signals that indicate or include information. A "multi-bit" item of data is an item of data that includes more than one bit. A "data processing system" is a physical system that processes data. A "data processor" or "processor" is any component or system that can process data, and may include one or more central processing units or other processing components.

An "image" is a pattern of physical light. An image may include characters, words, and text as well as other features such as graphics. An item of data "defines" an image when the item of data includes sufficient information to produce the image. For example, a two-dimensional array can define all or any part of an image, with each item of data in the array providing a value indicating the color of a respective location of the image.

Each location in an image may be called a "pixel." A pixel is the smallest segment of an image whose value is indicated in an item of data defining the image. In an array defining an image in which each item of data provides a value, each value or signal indicating the color of a location may be called a "pixel value" or "signal". Each pixel value is a set of color space coordinates in a "color coordinate form" of an image, the color coordinate form being a two-dimensional array defining an image.

An "image input terminal" (IIT) is a device that can receive an image and provide an item of data defining a version of the image. A "scanner" is an image input device that receives an image by a scanning operation, such as by scanning a document.

An "image output terminal" (IOT) is a device that can receive an item of data defining an image and provide the image as output. A "display" is an image output device that provides the output image in human viewable form. The visible pattern presented by a display is a "displayed image" or simply "image."

"Gamut" describes the entire range of perceived color that may be obtained under stated conditions. For example, the gamut of a particular printer is defined by the features of the printer and the inks or marking materials used therein. The term "hue" is used to describe the quality of color as perceived visually, usually described with respect to one or a combination of color names: white, gray, black, red, yellow, green blue, etc.

"Color separations" are used by printers to reproduce color artwork or images. Page description languages, i.e., PostScript™, treat most images as sampled images where the separations are the representation of the image. A "color space" is a method for specifying a color. The CIE system is an international standard for color specification that is independent of the characteristics of any particular output device. A "device color space" is a method for directly specifying colors that an output device is to produce. Device color spaces enable a page description language to specify color values that are directly related to their representation on an output device. These color spaces include RGB (red-green-blue), HSB (hue saturation-brightness) and CMYK (cyan-magenta-yellow-black).

Turning to FIG. 1, displayed therein is an exemplary color xerographic printing machine and networked personal computer workstation (PC) or data processing system incorporating features of the present invention therein. A multiple color original document 38 may be positioned on (optional) image input terminal (IIT), indicated generally by the reference numeral 10. In one embodiment the IIT contains document illumination lamps, optics, a mechanical scanning drive, and a charge coupled device (CCD array) or full width color scanning array. IIT 10 captures the entire image from original document 38 and converts it to a series of raster scan lines and moreover measures a set of primary color densities, i.e., red, green and blue (RGB) densities, at each point of the original document. IIT 10 may provide data on the scanned image to IPS 12, indirectly to PC 5 and/or directly to PC 5.

Digitized electronic documents may be created, screened, modified, stored or otherwise processed by PC 5 prior to transmission to IPS 12 for printing on printer 18. In a preferred embodiment, printer 18 is a Xerox Xprint 4915 or 4920 color laser printer. The display (not shown) of PC 5 may show electronic documents on a screen. IPS 12 may include a processor (not shown) required to perform the color correction operations of the present invention.

IPS 12 also transmits signals corresponding to the desired electronic or scanned image to ROS 16, which creates the output copy image. ROS 16 includes a laser with rotating polygon mirror blocks. The ROS illuminates, via mirror 37, the charged portion of a photoconductive member 20 of a marking engine, indicated generally by the reference numeral 19, at a resolution of at least about 400 pixels per inch, to achieve a set of subtractive primary latent images. Other implementations may include other pixel resolutions of varying types i.e., 600×600 spi, or even asymmetrical resolutions, such as 300×1200 spi, both configurations of which are employed in versions of the Xerox 4900 printer. The ROS will expose the photoconductive member to record three or more latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a sheet in superimposed registration with one another to form a multicolored image on the sheet. This multicolored image is then fused to the sheet forming a color print.

With continued reference to FIG. 1, printer or marking engine 19 is an electrophotographic printing machine. Photoconductive belt 20 of marking engine 19 is preferably made from a photoconductive material. The photoconductive member or belt 20 moves in the direction of arrow 22 to advance successive portions of the photoconductive surface sequentially through the various processing stations disposed about the path of movement thereof. Photoconductive belt 20 is entrained about rollers 23 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential. Next, the charged photoconductive surface is rotated to an exposure station, indicated generally by the reference numeral 35. Exposure station 35 receives a modulated light beam corresponding to information derived by IIT. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document or for black regions of a color original document using undercolor removal techniques. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station 65, indicated generally by the reference numeral 65. Transfer station 65 includes a transfer zone, generally indicated by reference numeral 64. In transfer zone 64, the toner image is transferred to a sheet of support material such as plain paper. At transfer station 65, a sheet transport apparatus, indicated generally by the reference numeral 48, moves the sheet (not shown) into contact with photoconductive belt 20. A sheet is advanced from a stack of sheets 56 disposed on a tray. A friction retard feeder 58 advances the uppermost sheet from stack 56 onto a pre-transfer transport 60. Transport 60 advances the sheet to sheet transport 48. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet to moves in a recirculating path for at least three cycles to complete the transfer of three or more different color toner images to the sheet in superimposed registration with one another.

Those skilled in the art will appreciate that the sheet may move in the recirculating path for more cycles when under color (black) removal or additional colors are employed. Each of the electrostatic latent images recorded on the photoconductive surface are developed with the appropriately colored toner and transferred, in superimposed registration with one another, to the sheet to form the multicolored print of the colored original document. After the last transfer operation, the sheet transport system directs the sheet to a conveyor 68. Conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to an output tray 78 for subsequent removal therefrom by the machine operator.

The final processing station in the direction of movement of belt 20, as indicated by arrow 22, is a photoreceptor cleaning apparatus, indicated generally by reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle. As mentioned above, other xerographic and non-xerographic printer hardware implementations may be used with the imaging systems of the present invention, such as in the case of versions of the Xerox 4900 family of printers (which employs an intermediate transfer system) in which certain aspects of the present invention are embodied.

Figure 2:
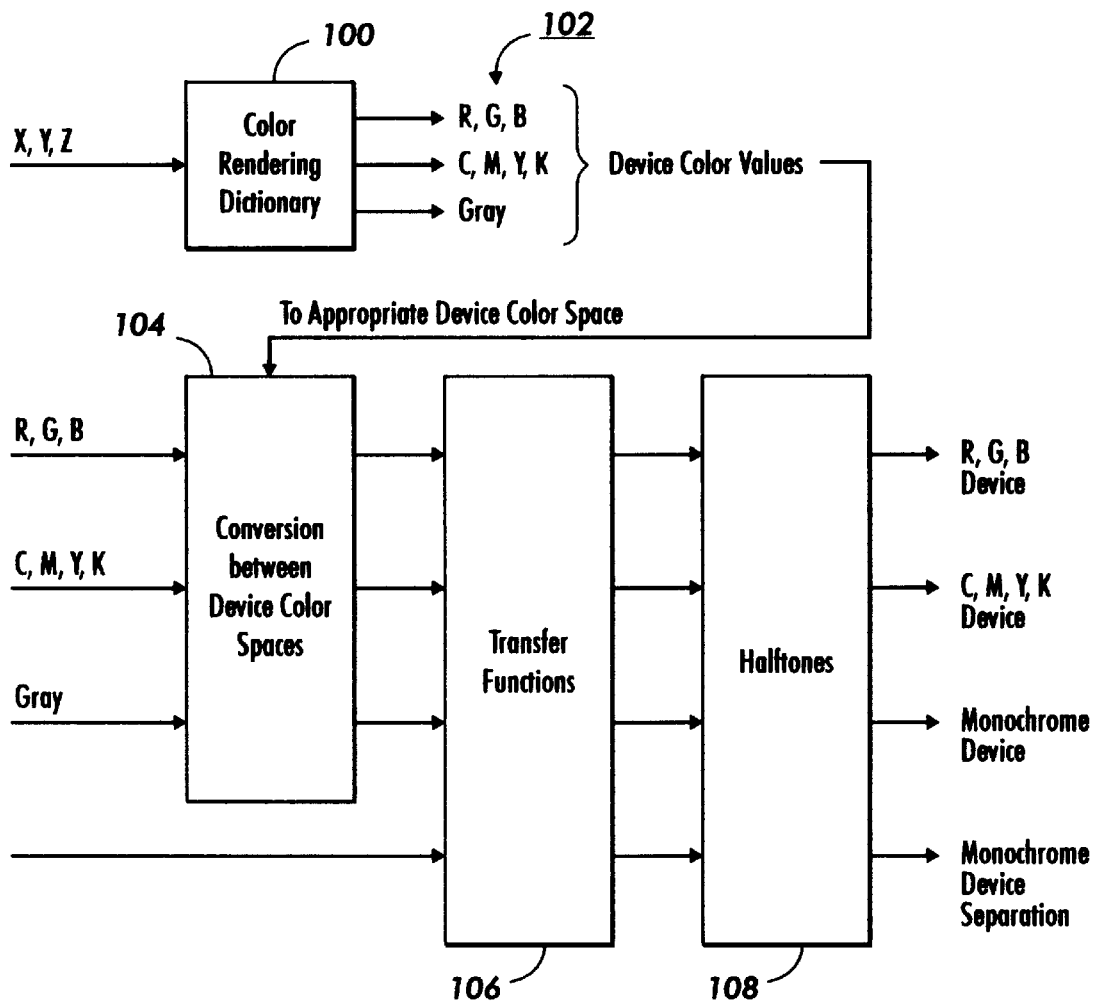
FIG. 2 is an illustration of the data flow in the IPS of the embodiment depicted in FIG. 1.

FIG. 2 illustrates the data flow of color separation information in an embodiment such as the color printer described with respect to FIG. 1. Color rendering is typically accomplished as the result of the processing of color separation data, as for example in IPS subsystem 12 in FIG. 1. Many printing system employ PostScript™ page description functionality. The PostScript interpreter reproduces colors in a raster output system such as the printer of FIG. 1 by a multi-step process that may include color conversions, gamma correction, halftoning and scan conversion.

FIG. 2 is an illustrative example of the use of a PostScript rendering operation to produce an output with the printer of FIG. 1. More specifically, an input to the IPS subsystem, for example the X, Y, Z internal color space values, is processed initially by a color rendering dictionary 100 where the internal color space values are preferably converted to one of a number of device color space values shown as output 102. The device color space values may then be passed to a serial color space conversion operation 104, where values appropriate for alternative device color spaces may be produced. Subsequently, the alternative device color space values may be passed through a transfer function represented by step 106. After a halftoning operation 108 the processed data is in a form that may be rendered by the printing devices illustrated, and preferably in CMYK for rendering by the printing system depicted in FIG. 1. Further details of the operations performed for rendering of color images are presented in Adobe Systems' "PostScript Language Reference Manual, Second Edition," Addison-Wesley, December 1990, pp. 176–204, the relevant portions of which are hereby incorporated by reference.

The present invention finds particular use in the color rendering operation 100 depicted in FIG. 2. As will be described in detail, the present invention is intended to provide a warping of the color space, particularly with respect to hue. It will be appreciated however, that the present invention may be applied not only to hue components, but also to a chroma component of the color space and equivalents thereof.

Figure 3:
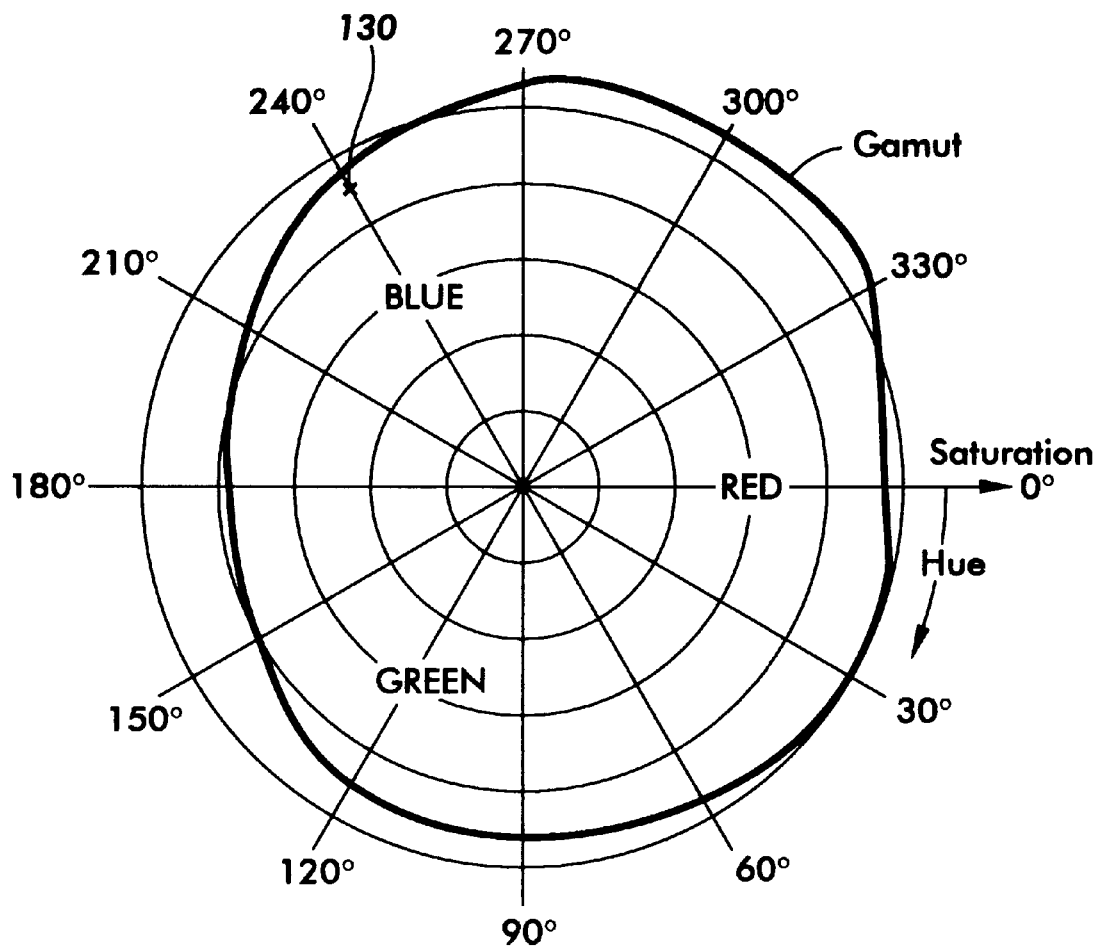
FIG. 3 is a two-dimensional representation of a constant brightness region of the color space.

Referring to pages 25–66 and in particular Plate III of "Principles of Color Technology, 2nd Ed." by F. W. Billmeyer et al., John Wiley & Sons, New York (1981), hereby incorporated by reference for its teachings relevant to color space, there is displayed a hue-saturation-brightness (HSB) color space representation as one might find in the Munsell System. In particular, the hue value in such a color space specifies a point on a color circle or band, but not its intensity or brightness. As illustrated from an alternative perspective in FIG. 3, the possible hue values in a particular device color space are typically equally spaced within the boundaries of the device color gamut. The primaries red, green and blue are equally spaced about the color circle at approximately 0, 120 and 240 degrees. Referring to FIG. 3, the color blue is characterized with a hue angle of approximately 240° as indicated by the point at reference numeral 130. Once specified in the HSB color space the coordinates are employed, as described with respect to FIG. 2, as the input to a color space conversion operation to produce CMYK values that are rendered by the printer. In a typical situation, the colors in the HSB color space are equally spaced throughout the color gamut of the printing system so that a wide range of colors may be printed. However, a system of this type often results in poor quality graphics rendering of primary colors because they are converted to equal amounts of printing inks. In other words, the selection of the color blue in the Munsell color space often results in the rendition of an output color that is closer to a "purple" because of equal quantities of cyan and magenta marking particles.

Figure 4:
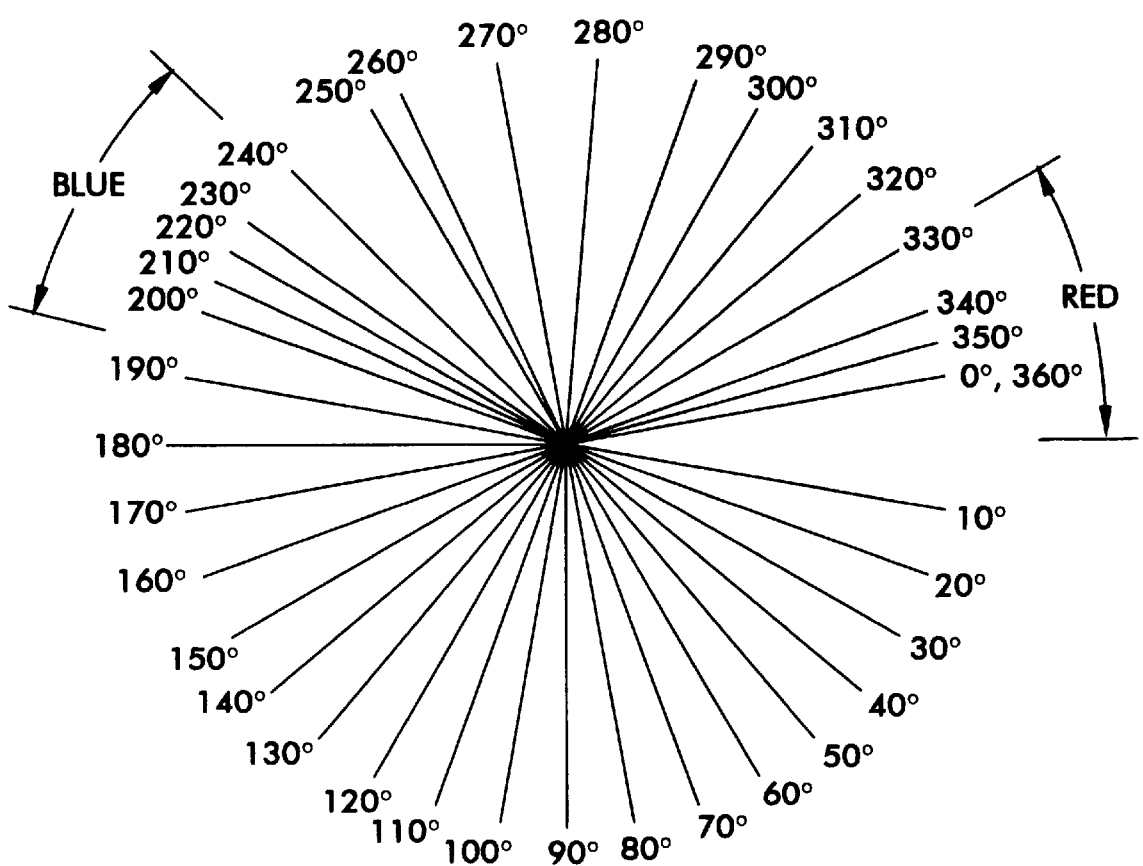
FIG. 4 is a two-dimensional representation of a warped color space produced to provide color correction using hue shifting in accordance with the present invention.
Figure 5:
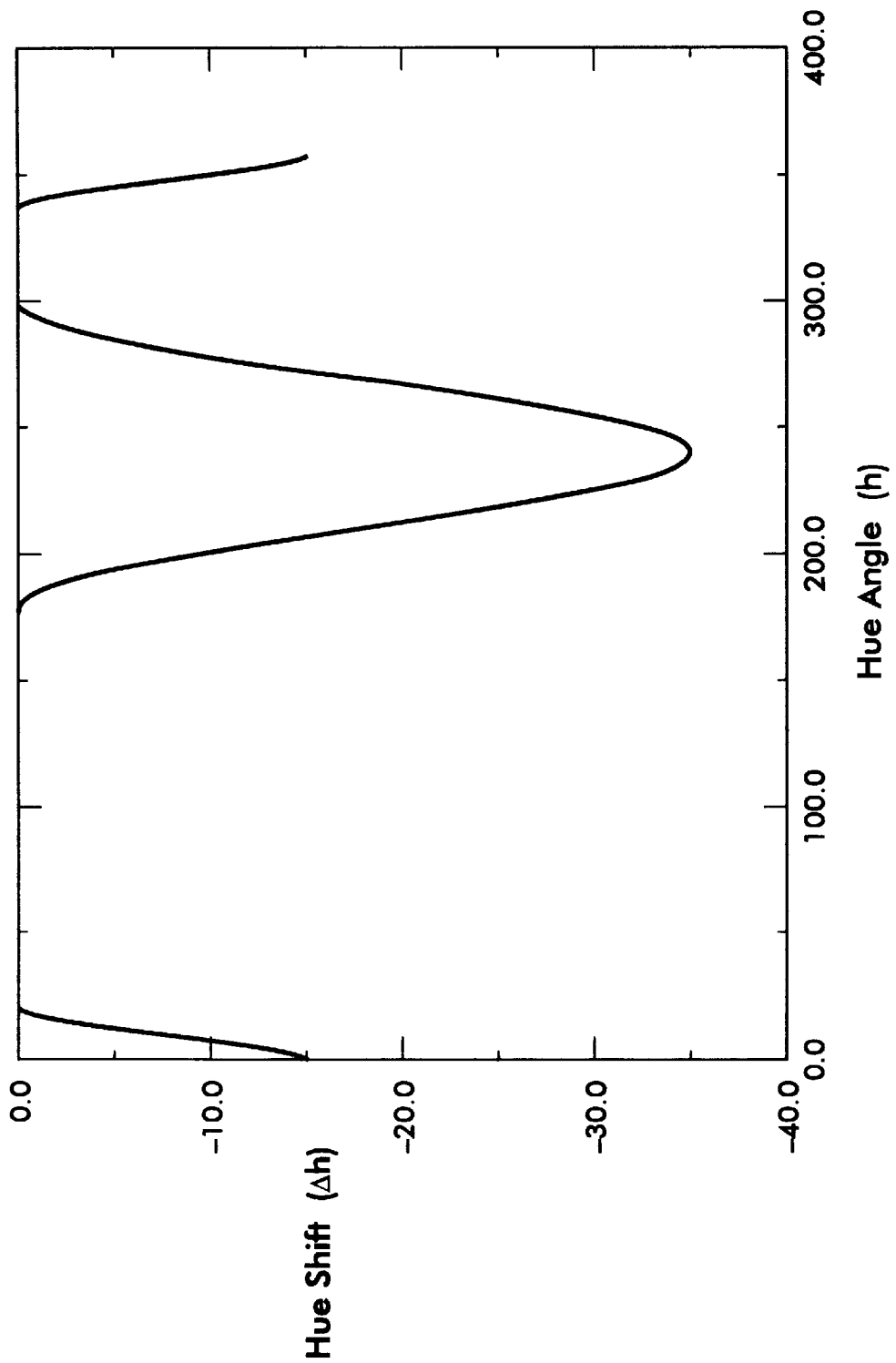
FIG. 5 is a graphical representation of the hue shift in accordance with the present invention, applied to the color space of FIG. 3 and as depicted in the two-dimensional representation of FIG. 4.

As shown in FIG. 4, the present invention overcomes such problems by shifting or warping the color space. In particular, the regions labeled blue and red in FIG. 4 contain more closely spaced angular values than do the regions lying between the blue and red regions. When the warped or shifted angles of FIG. 4 are superimposed upon the regular hue angle space of FIG. 3 an observer appreciates the different therebetween. Referring to FIG. 5, there is shown a graphical representation of the results of an exemplary shifting or warping operation. Specifically, FIG. 5 illustrates the amount of shifting (Δh) as a function of hue angle in the range of 0–360°. For example, it is apparent that in the hue angle range about 240° a maximum hue shift of approximately −35° occurs. The example depicted in FIG. 5 is specifically designed to improve the rendition of a "blue" output so as to produce what may be characterized as a "vivid blue".

Figure 6:
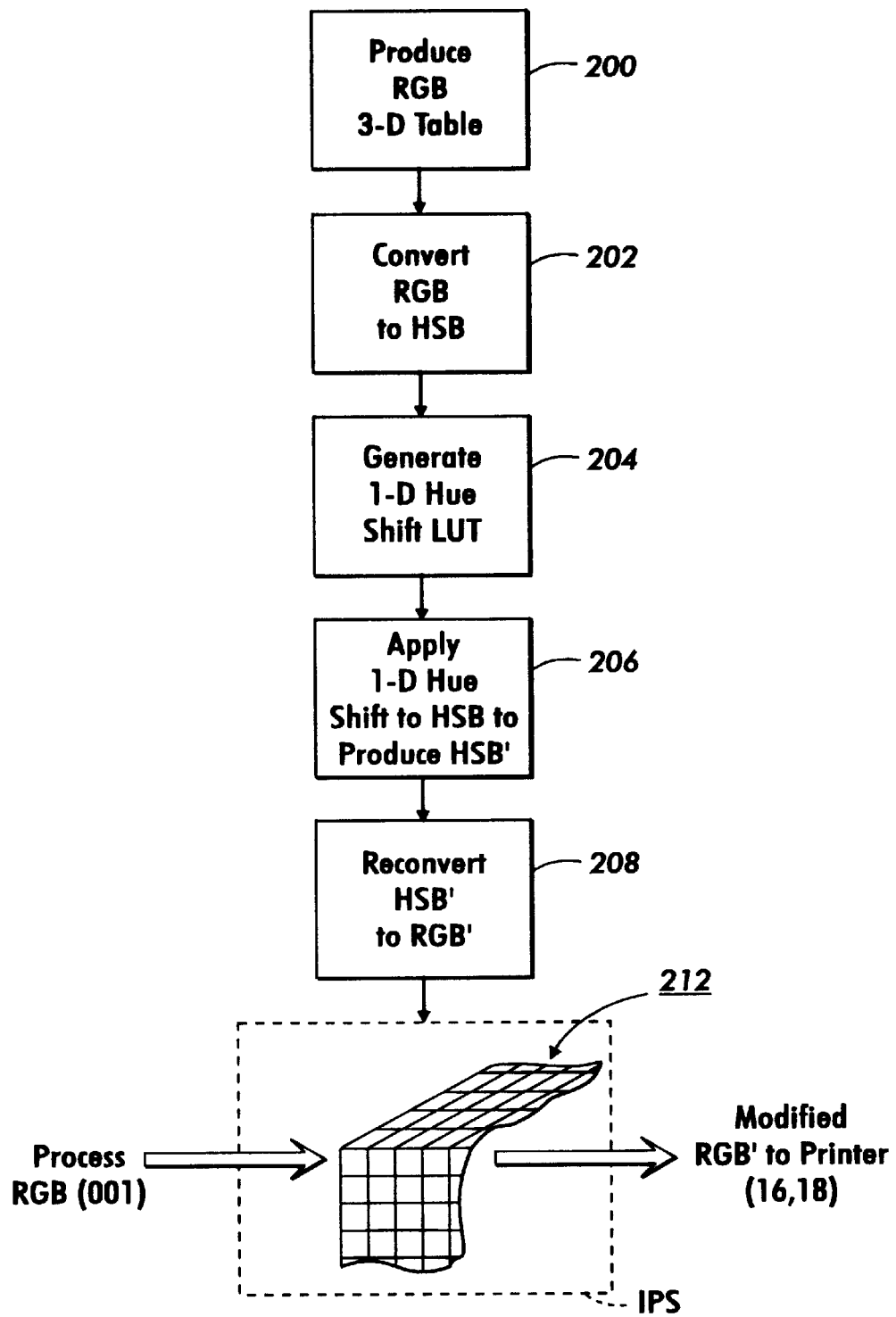
FIG. 6 is a flow chart illustrating the various steps of a preferred embodiment of the present invention.

Having described the effect on the color space accomplished by the warping or shifting operation of the present invention, attention is now turned to FIG. 6 in conjunction with the Software Appendix, where further details of the invention are provided. FIG. 6 is a flow chart illustrating the primary steps of a preferred embodiment of the present invention. Specifically, FIG. 6 illustrates a local or heuristic approach to the business graphics coloring problems previously described. As shown, the method first produces a table of RGB values, step 200, that are employed as a three-dimensional look-up table (LUT). The RGB LUT is produced in any one of a number of well-known schemes, for example, a manner similar to that in which color correction is accomplished. Once the RGB table values are produced, step 202 then converts the RGB values to HSB values (or alternatively HSV values), preferably to provide a color space with a hue component, or alternatively a chroma component. Once converted to HSB, a smoothed one-dimensional hue shift curve is generated at step 204 in accordance with the deltah.c program in the Appendix, to specify the hue shift as a function of hue angle. The output of such a program is shown, for example, as the curve depicted in FIG. 5 and as the warped color space depicted in FIG. 4. Subsequently, the one-dimensional curve is employed as a hue shift look-up table, where the index is the hue angle of the source color and the contents or output of the hue-shift LUT is the amount by which the hue angle is to be shifted. The hue-shift LUT is then "applied" to the table of HSB values at step 206 to produce a modified table HSB'. The HSB' table is generated as specifically described by the hueshift.c program found in the Software Appendix. The resulting HSB' table values are reconverted to RGB values as indicated by RGB' for use by the printing system.

Although depicted in an embodiment where all possible RGB input colors can be processed in accordance with the desired hue shift and the modified RGB' mapping stored for subsequent use, it will be appreciated by those skilled in the art that a single device color input triplet may be processed in accordance with the steps of FIG. 6 to produce a modified RGB' signal in a manner similar to that described herein.

As described, the resultant table of pairs of triplets, RGB', maps the process colors (e.g., blue and red) to what may be characterized as "perceptual" colors and this is accomplished in device space. For example, a process color input of "blue" (RGB=0,0,1) is passed to the RGB' mapping table 212, where the RGB signal is mapped to a shifted or warped color space representation to produce a modified RGB' signal (e.g., RGB=0,0.58,1).

In recapitulation, the present invention is a method for the improved rendition of business color graphics. The method alters or corrects the color space for sensitive colors in documents by employing a hue shifting operation to provide improved color rendering.

It is, therefore, apparent that there has been provided, in accordance with the present invention, a method and apparatus for applying a local or heuristic solution to a business graphics color rendering problem. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

---

SOFTWARE APPENDIX

```
/*deltah.c*/
/* Make a smooth curve of deltah as a function of h */
/* Takes a list of start, range, max values in stdin */
/* and makes a curve of 360 elements that specify to */
/* hueshift* how to warp the gamut. */
/* Fritz Ebner*/
/* start hue has to be the smaller hue value *before* modding by 360 */
#include <stdio.h>
#include <math.h>
#include <stdlib.h>
#define pi 3.1415927
/*******************************************/
main(int argc, char *argv[])
{ float start,range,maxh,newhue[360],doody;
int i,cosflag=1 ,cossquaredflag=0;
scanargs(argc, argv, "usage: deltah -cosl-cossquared",
"cos: cossquared:",
&cosflag, &cossquaredflag);
if (cossquaredflag) cosflag =0;
for (i=0;i<360;i++)
   newhue[i]=0;
if (cosflag) {
while(fscanf(stdin, "%f %f %f", &start, &range, &maxh) !=EOF) {
   for (i=0;i<360;i++) {
      if ((i >=start && i <fmod(start+range + 360.0,360.0)) ||
      (start+range > 360.0 && i <fmod((start+range),360.0)) ||
         (start+range > 360.0 && i >=start)) {
         if (i>=start)    newhue[i] += (maxh * 0.5 *
```

SOFTWARE APPENDIX

```
            (cos((pi/180.0)*((360.0/range)*(i-start) − 180.0)) + 1));
        else
            newhue[i] +=(maxh * 0.5 *
  (cos((pi/180.0)*((360.0/range)*fmod((i-start+360),360.0) − 180.0)) + 1
        }
      }
    } /* end while */
  }
  else { /* must be cos squared */
    while(fscanf(stdin, "%f %f %f", &start, &range, &maxh) !=EOF) {
      for (i=0;i<360;i++) {
        if ((i >= start && i <(mod(start+range + 360.0,360.0)) ||
          (start+range>360.0 && i < fmod((start+range),360.0)) ||
          (start+range > 360.0 && i >=start)) {
            if (i>=start) {
              doody = cos((pi/180.0)*((360.0/range)*(i-start) − 180.0));
              newhue[i] += maxh * 0.25 *      (doody + 1) * (doody + 1);
            } else {
              doody =
  cos((pi/180.0)*((360.0/range)*fmod((i-start+360),360.0) − 180.0));
              newhue[i] += maxh * 0.25 *      (doody + 1) * (doody + 1);
            }
          }
        }
      } /*endwhile*/
    }
    for (i=0;i<360;i++)
    printf ( "%f\n",newhue[i]);
    return 0;
  }
  /* hueshift.c */
  /* Takes a list of hsv or LCh numbers and munges the hue around */
  /* Fritz Ebner*/
  /* starthue has to be the smaller hue value *before* modding by 360 */
  #include <stdio.h>
  #include <math.h>
  #include <stdlib.h>
  #define pi 3.1415927
  /******************************************/
  main(int argc, char *argv[])
  { int
  hsvflag=1,LChflag=0,constflag=0,starthueflag=0,rangeflag=0,maxshiftflag
  =0;
  float constshift,intableflag,starthue,range,maxshift;
  (float hue, dum1, dum2;
  int i=0;
  float newhue[360];
  char *intable;
  FILE *fp,*fopen();
  /**************Get the proper stuff to do*************/
  scanargs(argc, argv, "usage: hueshift -hsvILCh -intable <file> -const
  num -starthue num -range num -maxshift num\n",
  "hsv:lLCh: intable:s const:f starthue:f range:f maxshift:f"
  &hsvflag, &Lchflag, &intableflag, &intable, &constflag, &constshift,
  &starthueflag, &starthue, &rangeflag, &range, &maxshiftflag,
  &maxshift);
  if (intableflag) {
    if ((fp =fopen(intable, "r")) == NULL) {
      fprintf(stderr, "hueshift: can't open %s for reading\n", intable);
      exit(1);
    }
    while(fscanf(fp, "%f", &newhue[i]) != EOF) {
      i++;
      if (i > 360) break;
    }
    for (i=0;i<360;i++) {
      newhue[i]+= i;
      fprintf(stderr, "Old hue %d New hue %d\n",i,(int) newhue[i]);
    }
  }
  else {
  for (i=0;i<360;i++)
    newhue[i]=i;
  if (constflag) {
    for (i=0;i<360;i++)
      newhue[i] += fmod(constshift + 360.0;360.0);
  }
  if (starthueflag) {
```

SOFTWARE APPENDIX

```
  for (i=0;i<360;i++) {
    if ((i >= starthue && i < fmod(starthue+range + 360.0,360.0))
  ||    (starthue+range>360.0 && i <
  fmod((starthue+range), 360.0))) {
      if (i>=starthue)      newhue[i] += (maxshift * 0.5 *
        (cos((pi/180.0)*((360.0/range)*(i-starthue) − 180.0)) + 1));
      else
        newhue[i] += (maxshift * 0.5 *
  (cos((pi/180.0)*((360.0/range)*(i) − 180.0)) + 1));
      }
    }
  }
  for (i=0;i<360;i++) {
    newhue[i] = fmod(newhue[i], 360.0);
    fprintf(stderr, "%d\n", (int)newhue[i]);
  }
  }
  if (hsvflag) {
    while(fscanf(stdin, "%f %f %f",&hue, &dum1, &dum2) != EOF)
      fprintf(stdout, "%f %f %f\n",fmod(360.0+ newhue[(int)
  hue],360.0), dum1, dum2);
    }
    else {
      while(fscanf(stdin, "%f %f %f",&dum1, &dum2, &hue) != EOF)
        fprintf(stdout, "%f %f %f\n", dum1, dum2, fmod(360.0+
  newhue[(int) hue],360.0));
    }
    return 0;
  }
```

I claim:

1. A method for warping a color gamut as a function of hue angle, comprising:

mapping a first plurality of equidistant hue angles within a predefined range to a second plurality of non-linearly spaced, non-equidistant output hue angles; and recording the mapping therebetween receiving a first hue angle associated with an image signal, said first hue angle being one of the first plurality of hue angles; and producing, as a result of the mapping, a second hue angle for the image signal, wherein the second hue angle is one of the second plurality of hue angles.

2. The method of claim 1, wherein the mapping between the first plurality of equidistant hue angles within a predefined range to a second plurality of non-linearly spaced, non-equidistant output hue angles is a function of at least one of the following:

a maximum hue shift;

a starting hue angle;

a range of hue angles to be shifted.

3. The method of claim 1, wherein the color gamut is warped in a localized fashion.

4. A method for color correcting an image, the image being represented as a plurality of image signals in a device color space, comprising:

characterizing a mapping function, the mapping function mapping at least one input thereto to an alternative color wherein the alternative color is determined by a shift in a single component of an alternative color space wherein the step of characterizing the mapping function includes making a multi-dimension look-up table of the device color space;

converting the multi-dimension look-up table to an alternative color space to produce a second look-up table, applying a component shifting function to the alternative color space to produce a third look-up tablet, and reconverting the third look-up table to the device color space to produce the mapping function; and applying the mapping function to each of the plurality of image signals to produce a plurality of modified image signals for rendering by a printing system.

5. The method of claim 4, wherein the single component is a hue component.

6. The method of claim 5, wherein the component shifting function comprises a one-dimensional hue shifting operation to modify the hue of a selected range of hues.

7. A method for color correcting an image, the image being represented as a plurality of image signals in a device color space, comprising:

characterizing a mapping function, the mapping function mapping at least one input thereto to an alternative color wherein the alternative color is determined by a shift in a single component of an alternative color space;, wherein the step of characterizing a mapping function includes making a multi-dimension look-up table of the device color space, converting the multi-dimension look-up table to an alternative color space, using a component shifting function, altering the alternative color space to produce a revised look-up table, and reconverting the revised look-up table to the device color space; and applying the mapping function to each of the plurality of image signals to produce a plurality of modified image signals for rendering by a printing system.

8. The method of claim 7, wherein the single component is a hue component.

9. The method of claim 7, wherein the single component is a chroma component.

\* \* \* \* \*